Feb. 3, 1970 G. F. KRTOUS 3,493,188
WEB CONTAINER-CARTRIDGE ASSEMBLY
Filed May 31, 1968 2 Sheets-Sheet 1
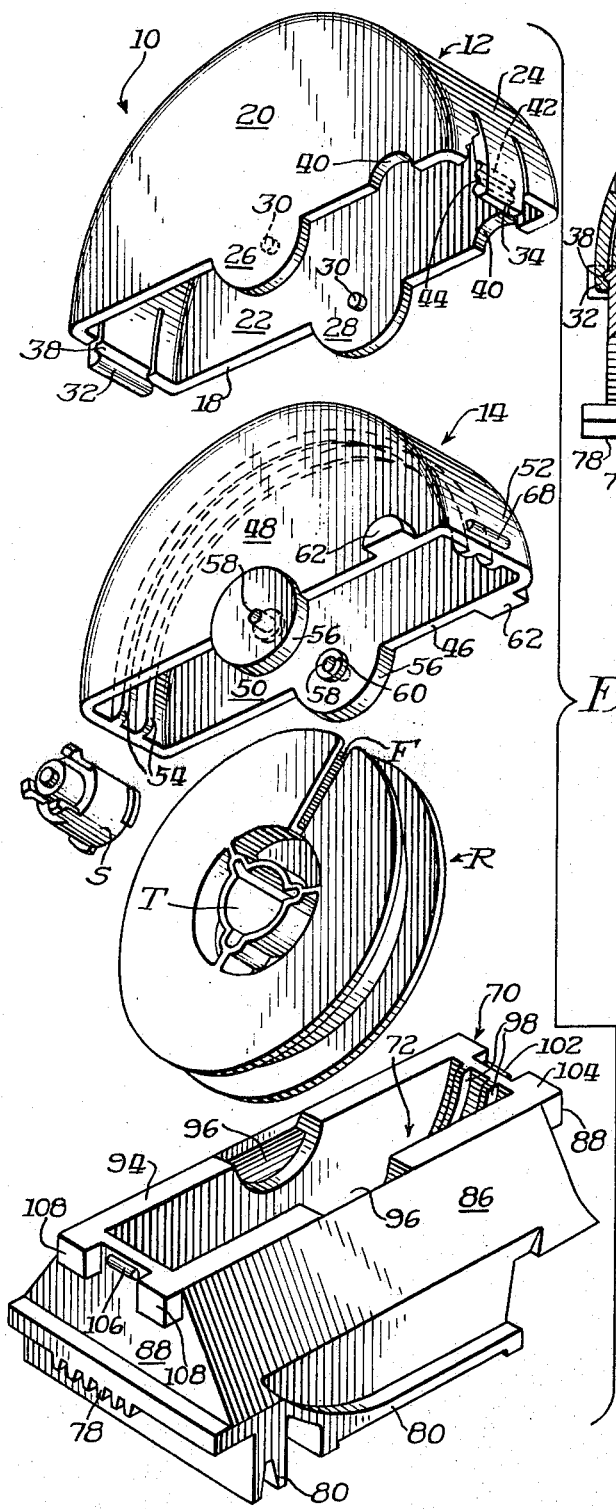
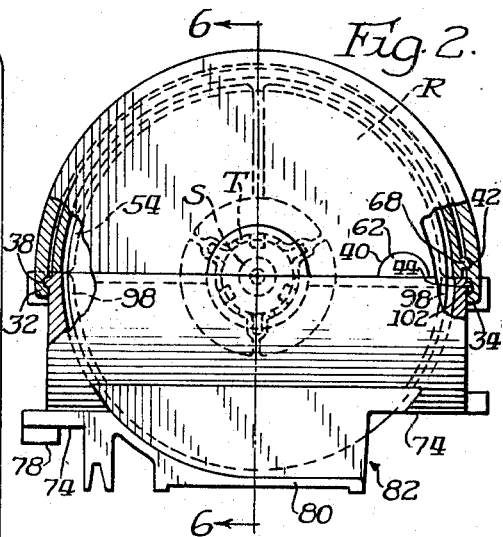
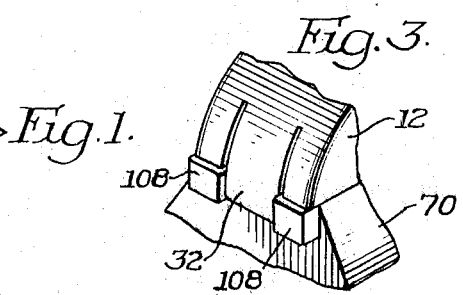
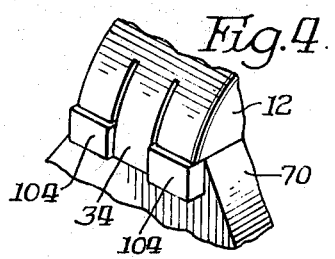
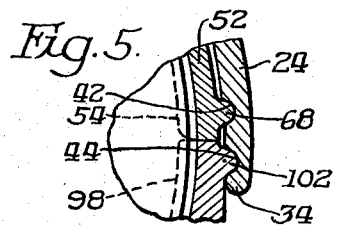
INVENTOR:
George F. Krtous.
BY
ATTYS Feb. 3, 1970  G. F. KRTOUS  3,493,188
WEB CONTAINER-CARTRIDGE ASSEMBLY
Filed May 31, 1968  2 Sheets-Sheet 2
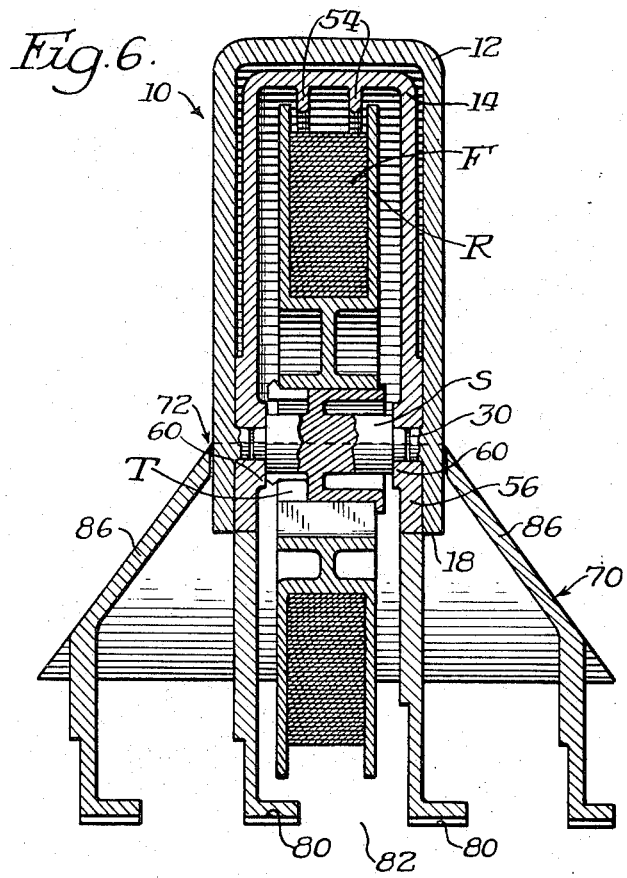
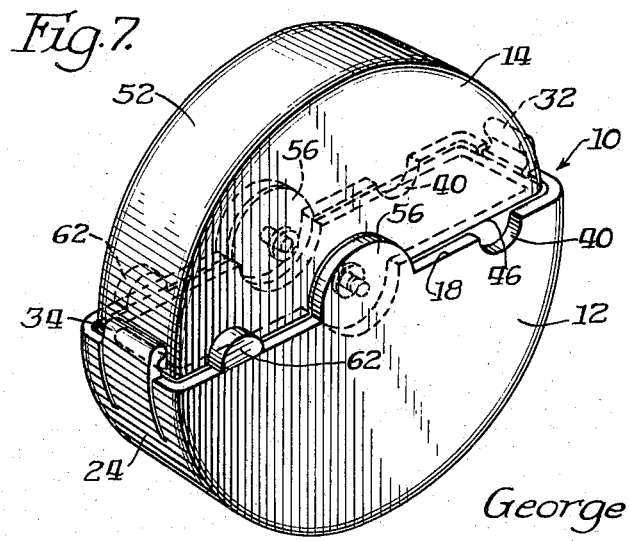
INVENTOR:
George F. Krtous.
BY
John E. Peele Jr. ATTYS

United States Patent Office 3,493,188
Patented Feb. 3, 1970

3,493,188
WEB CONTAINER-CARTRIDGE ASSEMBLY
George F. Krtous, Chicago, Ill., assignor to Bell & Howell Company, Chicago, Ill., a corporation of Illinois
Filed May 31, 1968, Ser. No. 733,554
Int. Cl. G03b 1/04
U.S. Cl. 242—71.1      10 Claims

ABSTRACT OF THE DISCLOSURE

A container-cartridge assembly having two telescopic cover portions which may be latched closed to form a container. Alternatively these cover portions may be latched in open position to a retainer for use in a projector.

---

The present invention relates to a container adapted to store an elongated web material, and adapted for use on a web handling device as a cartridge. Particularly, the container can store motion picture film, and can cooperate with a cartridge loaded motion picture projector.

Cartridges usable on a motion picture projector have been developed, and are shown in several U.S. patents. Often the film may be stored in these cartridges between showings. However, the film usually must be put into these cartridges at a processing plant having the necessary loading and assembling machines. Once the film is stored in the cartridge, the user cannot readily remove the film from the particular cartridge. Thus, the user is restricted to showing the particular film on the particular type of cartridge-loaded projector for which the cartridge was intended.

To overcome the limitations of the known containers and cartridges, the present invention provides a container in which film may be stored. The container may readily be opened to permit substitution of reels of film, and access to a film when desired. A container carrier member converts the container to a cartridge to be used with a motion picture projector. Once a reel of film, as returned from a processor, has been placed in the container, that reel of film need not be removed. However, when desired, that reel of film may be removed readily and a new reel of film inserted in the cartridge with minimum manipulation by the user.

The container, per se, is formed of a pair of substantially semi-circular portions. For storage of film in the container, the portions are brought together and latched so as to form a substantially dust-free enclosure. However, when the container is to be used as a cartridge, one of the portions may be telescoped relative to the other portion so as to permit ready access to the film by either the user's hand or the automatic threading elements of a projector, should the projector be of that type.

The container may, after opening, be placed on a retainer or container carrier member on a projector without fear of film spill. To return the film to storage after projection, the container is simply lifted from the retainer and the telescoped portions returned to their closed positions.

The retainer is provided to enable the container to be readily converted to a cartridge for use on a motion picture projector, particularly a projector of the automatic threading type. The container retainer is intended to accept the cartridge with its single reel of film. However, the projector may be of the type accepting a magazine adapted to contain a plurality of septums such as that disclosed in our co-pending application Ser. No. 706,239. The instant single reel cartridge concept has advantages wherein it may be used when the user does not desire to project several films on such a projector. Typically, the user has just received a single reel of processed film and desires to project it without removing a reel of film previously stored in a magazine. The new reel of film need only be placed in the container, the container placed on the retainer on the projector, and that film projected. The film may be stored indefinitely in the container.

Cooperating portions of the retainer and the container permit insertion of the container only in the proper manner. Because of these cooperating portions, the container cannot be inserted erroneously. That is, if the reel is inserted in the container with the leading end of the film adapted to be inserted in a projector upon clockwise rotation, the container cannot be inserted into the retainer in a reverse direction.

Thus, an object of the invention is to provide a novel film storage container.

Another object of the invention is to provide a novel container convertible into a cartridge usable on a motion picture projector.

Yet another object is to provide a container adapted to be readily opened and closed, which container is substantially dust-free when closed.

Still another object is to provide a container, which when converted to a cartridge cannot be placed on a projector in an erroneous manner.

Further and other objects will be apparent from the description of the accompanying drawings in which like numerals refer to like parts.

In the drawings:

FIG. 1 is an exploded perspective view of the several components of the novel container-cartridge and retainer, and also of reel hub adapter and a typical reel which might be used within the container;

FIG. 2 is an elevational view of a cartridge supported in the retainer, with parts broken away;

FIGS. 3 and 4 are slightly enlarged perspective views of the ends of the container when supported on the retainer, both figures being to the same scale;

FIG. 5 is an enlarged sectional view of one latch assembly showing part of the container-cartridge latched to the retainer;

FIG. 6 is a sectional view of the container and retainer taken along line 6—6 in FIG. 2; and FIG. 7 is a perspective view of the container closed for storage.

Referring first to FIG. 7, a container 10 is disclosed in closed condition. The container comprises first and second cover portions 12 and 14, respectively, which portions will be described hereafter as outer portion 12 and inner portion 14. The terms "outer" and "inner" are applied to define the relative conditions of the portions when the container is open. In this preferred form, the cover portions are each molded as a single piece of material preferably plastic.

Referring now to FIG. 1, container-cartridge 10 is shown in an exploded view to permit a clear showing of the components. Outer cover portion 12 is seen to be of substantially semi-circular, hollow construction. A substantially flat edge portion 18 defines the limits of a pair of semi-circular side portions 20, 22 and part of a rim portion 24. This flat edge is deformed centrally of side portions 20, 22 to form semicircular bearing portions 26, 28. In this preferred embodiment, these bearing portions extend downwardly from the side portions. Substantially centrally of the completed circle defining the bearing portions 26, 28, and aligned with edge 18, a stub shaft or pivot member 30 extends inwardly from the interior of each side portion.

Interrupting part of edge portion 18 and cooperating with rim portion 24 are a pair of latch or positioning members 32, 34, each forming an element of a latch assembly. The left latch member 32, as oriented in FIG. 1, is formed as a tab partially cut from the rim portion 24. The tab portion extends below the edge 18, and is formed with a relief 38. As will be explained hereafter, this relief may be snapped over a raised portion of another element of the latch assembly to retain the container in closed condition. Because the latch member 32 is partially cut from the more solid rim portion 24, member 32 can be deflected slightly by the user to release the groove from the mentioned raised portion of a cooperating latch element. A pair of cutouts 40 also interrupt edge 18 and side portion 18.

Latch member 34, oriented to the right of the outer cover portion 12 in FIG. 1, and shown enlarged in FIG. 5, is formed substantially as is left latch member 32. However, an upper relief 42 and a lower relief 44 are provided in this latch member. The function of these relief areas will be described in a later paragraph.

The inner cover portion or sleeve 14 is constructed substantially semicircularly as is the outer cover portion. A substantially flat edge portion 46 defines the limits of a pair of side portions 48, 50, and of a rim portion 52. Interior of the rim portion, a pair of guide ways or ridges 54 are integrally molded to center a reel R, about which reel may be wound an elongated web, such as film F, in FIG. 6. The ridges, by extending between the reel's flanges, prevent web F from falling outside the edges of the flanges and becoming wedged between the reel and holder 14. Edge portion 46 is interrupted by semicircular locator portions 56 in which receiving portions 58 are formed to accept the stub shafts 30 of the hood 12 and a reel supporting axle S. Axle S is centered between the interior of sides 48 and 50 by bosses 60 surrounding the receiving portions 58.

Extending outwardly from side portions 48, 50 of sleeve 14 near one end of rim portion 52 are a pair of finger grips 62. In addition to their primary purpose, the grips prevent one cover portion from telescoping more than is desired whether the container is opened or closed. These grips are shown as being of semicircular configuration to cooperate with the semicircular cutouts 40 in hood 12, but both may be otherwise shaped so long as they may cooperate with one another.

A latch lug 68 extends beyond the exterior of rim portion 52 of the inner cover or sleeve portion 14. Latch lug 68 cooperates with upper relief 42 in latch member 34 of hood 12 to retain this sleeve telescoped in the hood. When so telescoped, grips 62 rest in cutouts 40 as seen in FIG. 2. To close the container, the tab or latch member 34 is biased outwardly to release latch lug 68 from relief 42. While the latch member is so distorted, finger grips 62 may be used to rotate the sleeve about the axis defined by stub shafts 30 to a closed position. In this position, the latch lug 68 cooperates with the relief 38 in tab 32 of hood 12 to retain the container closed.

To insert into the container a reel R adapted to contain film, it is only necessary to pass the reel support axle S into the spindle opening T of the reel. The axle may then be snapped into the receiving portions 58 of sleeve 14 after slight outward distortion of the locating and bearing portions of the container. Because the material is selected so that it returns to its original dimensions, the distorted portions return to snap the axle into place.

Container 10 may be used as a storage container without additional components. However, the instant concept provides for the alternative use of the container in the form of a cartridge. To support such a cartridge on a motion picture projector (not shown), a retainer 70, which may be either integral with the projector or an adapter supportable thereon, is disclosed. This retainer, shown at the bottom of FIG. 1, is formed with a single chamber 72 to receive the container-cartridge. The retainer is elongated, and wider than the cartridge to provide a stable base when associated with a projector. On a lower ledge 74 of the retainer is formed a rack 78 to cooperate with an index gear (not shown) on the projector. Similarly, guide and riding surfaces 80 are provided on the retainer bottom. These surfaces enable the retainer to be moved on the supporting surface of the projector by the index gear. This movement is desirable for accurate alignment of a film outlet opening 82 of the retainer over a film inlet opening in the projector.

The retainer is formed with a pair of relatively long side portions 86, and a pair of relatively narrow end portions 88. Chamber 72 is an internally formed slot of effectively semicircular configuration. The top of the retainer defines a substantially flat cartridge support surface 94. This surface is reduced along the side wall by a pair of locating receivers 96 into which the locators 56 of the cartridge can be seated. Along the interior circumference of chamber 72 are a pair of guide ways or ridges 98 which cooperate with and function in the same manner as the ridges 54 in inner cover portion 14 to align a film reel.

A first latch rib 102 is formed between a positioner, defined as a pair of blockers 104 on the exterior of one end wall 88 of retainer 70, and a second latch rib 106 is formed between another positioner shown as a pair of blockers 108 on the other end wall. As seen in FIG. 2, latch ribs 102, 106 cooperate respectively with relief portions 38 and 44 of hood 12 when the container is positioned on the retainer. Release of the latch members permits lifting the container from the retainer.

Orientation of the container on the retainer in the same manner each time it is placed thereon is assured by cooperation between positioners or blockers 104, 108 and the latch or positioning members 32, 34. As seen by a comparison of FIGS. 3 and 4, drawn to the same scale, blockers 108 are spaced apart further than blockers 104, and positioning members 32 and 34 have widths intended to cooperate with this spacing. Thus, it can be readily appreciated that positioning member 32 would be rejected or prevented from passing between blockers 104 on retainer 70 if the container was incorrectly oriented. Hence, correct orientation of the container-cartridge is assured.

With the structures above described, a container-cartridge is formed wherein the container can be used to store a film as shown in FIG. 7, or can be used as a film supply cartridge when positioned on a retainer as in FIG. 2. In the latter position, the container is releasably latched on the retainer. In the former condition, the telescopic cover portions may be opened for loading releasably or latched closed for storage. The multifunction container is thus seen to have several advantages over known constructions.

It is to be understood that the embodiment shown is illustrative of the principal operation of a container-cartridge which can be used to store a reel of web material and that certain changes, alterations, modifications or substitutions can be made in the structure of the device without departing from the spirit and scope of the claims.

The embodiments of the invention in which an exclusive property or privilege is claimed are defined as follows:

1. A container-cartridge assembly adapted to alternatively enclose and support an elongated web on a web handling apparatus, comprising:

a container defined by first and second container portions adapted to be telescopically arranged;

means on one of said portions supporting the other said portion for relative movement into and out of telescopic arrangement wherein an open and closed container is formed respectively; and a container retainer supportable on the web handling apparatus for conversion of said container to a cartridge when said container is in an open condition, and positioned on said retainer.

2. An assembly as in claim 1 wherein one of said container portions includes a part of a distortable latch assembly and the other portion includes another part of the latch assembly, to cooperate with said first part of the assembly to releasably retain said container in open condition.

3. An assembly as in claim 1 wherein one of said container portions includes first and second distortable parts of a latch assembly and the other portion includes another part of the latch assembly to cooperate with said first and second parts to releasably retain said container in open and closed condition.

4. An assembly as in claim 1 wherein the interior of said container portions includes guide ways for aligning a reel containable in the container when the container is open and closed.

5. An assembly as in claim 4 wherein said retainer includes guide ways for aligning a reel when the container is supported on the retainer as a cartridge.

6. An assembly as in claim 1 including cooperating releasable latch members on one of said first and second container portions and on said container retainer.

7. An assembly as in claim 6 wherein said container portion includes a first positioning member of one width and a second positioning member of another width; and said container retainer is elongated and includes on each end, positioner portions spaced apart to accept said positioning member of one width and reject said second positioning member whereby said container can be oriented on said retainer in only one condition.

8. An assembly as in claim 1 wherein said retainer has locating portions receiving locator portions on said container when said container is open.

9. An assembly as in claim 1 wherein said means on one container portion for supporting said other container portion is a receiver into which a pivot member of the other portion is insertable.

10. An assembly as in claim 1 wherein one of said container portions includes manually engageable grip means wherein said one portion can be moved into and out of telescoped conditions as to the other portion.

References Cited

UNITED STATES PATENTS 2,204,414    6/1940    Hurd _____ 242—71.1

NATHAN L. MINTZ, Primary Examiner